(12) United States Patent
Hirose

(10) Patent No.: US 11,113,265 B2
(45) Date of Patent: Sep. 7, 2021

(54) INFORMATION PROCESSING APPARATUS AND INFORMATION PROCESSING SYSTEM

(71) Applicant: FUJITSU LIMITED, Kawasaki (JP)

(72) Inventor: Atsuhito Hirose, Odawara (JP)

(73) Assignee: FUJITSU LIMITED, Kawasaki (JP)

( * ) Notice: Subject to any disclaimer, the term of this patent is extended or adjusted under 35 U.S.C. 154(b) by 284 days.

(21) Appl. No.: 16/051,968

(22) Filed: Aug. 1, 2018

(65) Prior Publication Data

US 2019/0095479 A1 Mar. 28, 2019

(30) Foreign Application Priority Data

Sep. 26, 2017 (JP) .............................. JP2017-184912

(51) Int. Cl.
G06F 16/23 (2019.01)
G06F 16/25 (2019.01)
G06F 9/44 (2018.01)

(52) U.S. Cl.
CPC ............ *G06F 16/2365* (2019.01); *G06F 9/44* (2013.01); *G06F 16/252* (2019.01)

(58) Field of Classification Search
CPC ....... G06F 16/2365; G06F 16/252; G06F 9/44
See application file for complete search history.

(56) References Cited

U.S. PATENT DOCUMENTS

2006/0222176 A1 10/2006 Ohishi
2007/0294307 A1* 12/2007 Chen ...................... G06F 16/22
2009/0313210 A1 12/2009 Bestgen et al.
2014/0067824 A1* 3/2014 DeLuca .............. G06F 16/2255
707/747
2016/0085797 A1* 3/2016 Patiejunas ........... G06F 16/2365
707/690

FOREIGN PATENT DOCUMENTS

JP 2013-164866 8/2013
JP 2015-534143 11/2015
WO WO 2014/025821 A1 2/2014

OTHER PUBLICATIONS

Espacenet English abstract for Japanese Patent Publication No. 2013-164866, published Aug. 22, 2013.
Espacenet English abstract for Japanese Patent Publication No. 2015-534143, published Nov. 26, 2015.
Japanese Office Action dated Jul. 6, 2021 for Japanese Patent Application No. 2017-184912, 6 pages.

* cited by examiner

*Primary Examiner* — Loc Tran
(74) *Attorney, Agent, or Firm* — Staas & Halsey LLP

(57) ABSTRACT

An information processing apparatus includes a memory, a communication interface, and a processor. The memory stores therein a first code generated from data structure information describing at least one data item defined in a database. The communication interface receives a request message including a second code, which is a message requesting a data read or write operation on the database. The processor compares the first code with the second code, permits the requested data read or write operation if the first and second codes are the same, and performs an exception process to check for consistency between the data items of the database and the request message if the first and second codes are different.

10 Claims, 19 Drawing Sheets

HASH VALUE TABLE 531

| DATABASE NAME | SCHEMA NAME | TABLE NAME | HASH VALUE |
|---|---|---|---|
| DB1 | SCM1 | tbl_a | 0xabcdefgh |
| | | tbl_b | ... |
| | SCM2 | ... | |
| DB2 | ... | | |

FIG. 7

REQUEST MESSAGE

| ITEM NAME | SET VALUE |
|---|---|
| SERVER IP ADDRESS | 101.23.11.505 |
| SERVER PORT NUMBER | 80 |
| CLIENT ID | CL001 |
| REQUEST NUMBER | 000000001 |
| CLIENT IP ADDRESS | 101.23.11.503 |
| CLIENT PORT NUMBER | 80 |
| CLIENT PROCESS ID | 4438 |
| CLIENT THREAD ID | 47470217350064 |
| SESSION ID | 102367598 |
| TRANSMISSION TIME | 2013/8/19 15:32.32.225 |
| OPERATION TYPE | SELECT |
| TARGET RESOURCE | tbl_a |
| HASH VALUE | 0xhgfedcba |
| INPUT INFORMATION | WHERE COLUMN2=5 |
| OUTPUT INFORMATION | COLUMN1 |
| DATA STORAGE LENGTH | 16 |

TABLE DEFINITION FILE
134

```
CREATE TABLE ACCOUNT (
    USERID      CHARACTER(4),    -- KEY
    COMPANY     INTEGER,         -- VALUE1
    LNAME       VARCHAR(255),    -- VALUE2
    FNAME       VARCHAR(255),    -- VALUE3
    EMAIL       VARCHAR(255),    -- VALUE4
    PASSWD      VARCHAR(255),    -- VALUE5
    PRIMARY KEY(USRID)
);
```

FIG. 14

REQUEST MESSAGE 332

| ITEM NAME | SET VALUE |
|---|---|
| SERVER IP ADDRESS | 101.23.11.504 |
| SERVER PORT NUMBER | 80 |
| CLIENT ID | CL001 |
| REQUEST NUMBER | 000000001 |
| CLIENT IP ADDRESS | 101.23.11.503 |
| CLIENT PORT NUMBER | 80 |
| CLIENT PROCESS ID | 4438 |
| CLIENT THREAD ID | 47470217350064 |
| SESSION ID | 102367598 |
| TRANSMISSION TIME | 2013/8/19 15:32.32.225 |
| OPERATION TYPE | get |
| TARGET RESOURCE | ACCOUNT |
| HASH VALUE | 0xhgfedcba |
| INPUT INFORMATION | 201709070001 |
| DATA STORAGE LENGTH | 16 |

FIG. 15

HASH VALUE TABLE ⟋532

| DATABASE NAME | SCHEMA NAME | TABLE NAME | HASH VALUE COUNT | TIMESTAMP | HASH VALUE |
|---|---|---|---|---|---|
| DB1 | SCM1 | tbl_a | 2 | 2016/3/21 10:15 | 0xhgfedcba |
| | | tbl_b | ... | 2017/6/28 17:33 | 0xabcdefgh |
| DB2 | SCM2 | | | ... | ... |

FIG. 16

INFORMATION PROCESSING APPARATUS AND INFORMATION PROCESSING SYSTEM

CROSS-REFERENCE TO RELATED APPLICATION

This application is based upon and claims the benefit of priority of the prior Japanese Patent Application No. 2017-184912, filed on Sep. 26, 2017, the entire contents of which are incorporated herein by reference.

FIELD

The embodiments discussed herein relate to an information processing apparatus and an information processing system.

BACKGROUND

Online systems have been used, where a plurality of information processing apparatuses connected over a network perform data processing while communicating with each other. In an online system, a database is configured in an information processing apparatus functioning as a server and an application interface is defined to implement a communication protocol for requesting data manipulation on the database. In addition, a client application for communication with the server via the application interface is created and deployed in an information processing apparatus functioning as a client.

After such an online system is configured and its operation starts, the online system may be revamped. A typical example of the revamp may be a change in the data structure of a database in the online system. The change in the data structure of the database may involve changing an application interface that a client uses to request a server to perform data manipulation, and therefore a client application may need to be modified accordingly.

If, after the data structure is changed, an existing client application that is not compatible with the changed data structure starts to run, an inconsistency in application interface may occur between the client and the server and this inconsistency may cause an error in server's processing. The error due to the inconsistency in application interface may occur if the client application is not modified correctly or if the modified client application is not deployed correctly. To deal with this, in the case where the data structure of the database is changed in the revamp, a regression test is carried out to detect such an inconsistency in application interface.

In this connection, a multifunction machine that tests an application program after startup has been proposed. The proposed multifunction machine obtains device support information indicating functions supported by the multifunction machine and application use information indicating functions used by the application program. The multifunction machine compares the device support information with the application use information, and if a function listed in the application use information is not included in the device support information, stops execution of the application program.

In addition, an archival data storage system has been proposed, which specifies the storage location of a data object using an encoded data object identifier. The proposed archival data storage system generates the data object identifier on the basis of access control information, size, payload digest, error detection code, and others of the data object.

See, for example, Japanese Laid-open Patent Publication No. 2013-164866 and International Publication Pamphlet No. WO 2014/025821.

In the regression test, a client sends a variety of request messages to a server in order to check for consistency in application interface. Therefore, the regression test imposes a heavy load and is inefficient, which is a problem.

SUMMARY

According to one aspect, there is provided an information processing apparatus including a memory configured to store therein a first code generated from first data structure information, the first data structure information describing at least one data item defined in a database; a communication interface configured to receive a request message including a second code, the request message requesting a data read or write operation on the database; and a processor configured to compare the first code with the second code, to permit the requested data read or write operation upon determining that the first code and second code are identical, and to perform an exception process to check for consistency between the at least one data item of the database and the request message upon determining that the first code and the second code are different.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates a first example of a hash value table;
FIG. 8 illustrates a first example of a request message;
FIG. 14 illustrates a second example of a table definition file;
FIG. 15 illustrates a second example of a request message;
FIG. 16 illustrates a second example of a hash value table.

DESCRIPTION OF EMBODIMENTS

Hereinafter, the preferred embodiments will be described with reference to the accompanying drawings.

First Embodiment

A first embodiment will be described.

Figure 1:
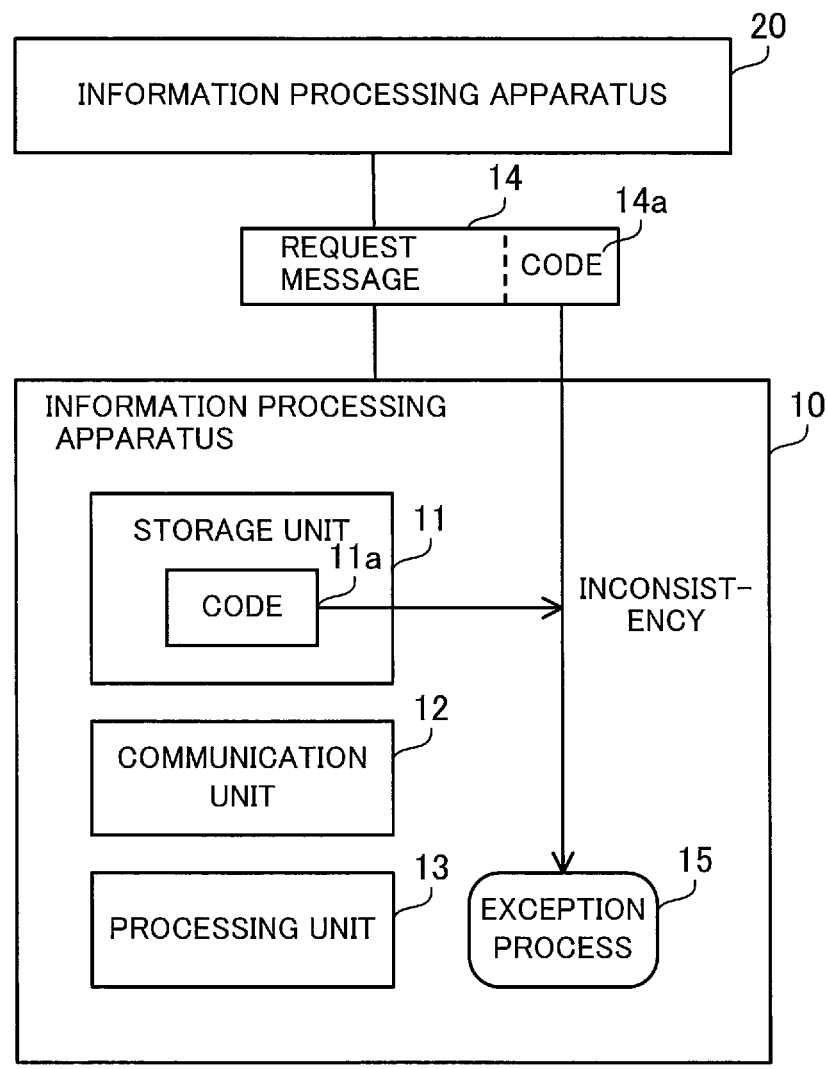
FIG. 1 is a view for explaining an information processing system according to a first embodiment.

FIG. 1 is a view for explaining an information processing system according to the first embodiment.

The information processing system of the first embodiment includes information processing apparatuses 10 and 20, which are connected to each other over a network.

The information processing apparatus 10 holds a database using a non-volatile storage device and controls access the database. The information processing apparatus 10 provides an application interface that is used for requesting data read or write operations on the database in agreement with a defined data structure of the database. The information processing apparatus 20 requests the information processing apparatus 10 to perform read or write operations on the database. Considering the relationship between the information processing apparatuses 10 and 20, the information processing apparatus 10 functions as a server and the information processing apparatus 20 functions as a client.

The data structure of the database held in the information processing apparatus 10 may be changed afterward. If a request from the information processing apparatus 20 to the information processing apparatus 10 is consistent with the application interface provided by the information processing apparatus 10, the information processing apparatus 10 is able to perform the requested read or write operation on the database without fail. If the request from the information processing apparatus 20 to the information processing apparatus 10 is not consistent with the application interface provided by the information processing apparatus 10, however, an error may occur when the information processing apparatus 10 performs the requested read or write operation on the database. Such an inconsistency in application interface occurs due to a difference between the data structure of the database held in the information processing apparatus and a data structure expected by the information processing apparatus 20.

The information processing apparatus 10 includes a storage unit 11, a communication unit 12, and a processing unit 13. The storage unit 11 may be volatile semiconductor memory, such as random access memory (RAM), or non-volatile storage, such as a hard disk drive (HDD). The communication unit 12 is a communication interface for communication with the information processing apparatus 20. The communication unit 12 may be a wired or wireless communication interface. The processing unit 13 may be a processor, such as a central processing unit (CPU) or a digital signal processor (DSP), for example. In this connection, the processing unit 13 may include an application specific integrated circuit (ASIC), field programmable gate array (FPGA), or another application specific electronic circuit. The processor runs a program stored in a memory, such as RAM. A set of multiple processors may be called a "multiprocessor", or simply a "processor".

The storage unit 11 stores therein a code 11a generated from data structure information of the database. The data structure information describes at least one data item defined in the database. For example, the data structure information indicates the item name, data type, data length, and other attributes of each data item. The code 11a is a fixed-length or variable-length bit string and is used for determining identity with another code. It is preferable that the same code be generated from the same data structure information and different codes be generated from different data structure information. For example, the code 11a is a hash value that is calculated from the data structure information using a prescribed hash function. The storage unit 11 may further store therein the data structure information. The information processing apparatus 10 may generate the code 11a from the data structure information or may obtain the code 11a generated by another information processing apparatus.

The communication unit 12 receives a request message 14 from the information processing apparatus 20. The request message 14 is to request database manipulation, such as a data read or write operation on the database. The request message 14 includes a code 14a. The code 14a is a code generated from data structure information describing at least one data item expected by the information processing apparatus 20 and is held in the information processing apparatus 20.

The codes 11a and 14a are expected to have been generated from the same data structure information. However, if the definitions of a data item of the database are updated afterward and the update is not reflected on the information processing apparatus 20 correctly, the code 14a may have been generated from data structure information that is older than that used for generating the code 11a. In the case where the codes 11a and 14a have been generated from different data structure information, these codes 11a and 14a may be different.

The information processing apparatus 20 may obtain the code 14a from another information processing apparatus or may obtain the data structure information from another information processing apparatus and generate the code 14a. Alternatively, the information processing apparatus 20 may obtain a client program having the code 14a embedded therein from another information processing apparatus and run the client program. The client program is to send the request message 14, for example.

When receiving the request message 14, the processing unit 13 compares the code 11a stored in the storage unit 11 with the code 14a included in the request message 14. If the codes 11a and 14a are the same, the processing unit 13 determines that there is no inconsistency in application interface. That is, the processing unit 13 determines that the expected data items indicated in the request message 14 are consistent with the data items defined in the database. Then, the processing unit 13 permits the requested read or write operation on the database.

If the codes 11a and 14a are different, on the other hand, the processing unit 13 determines that there may be an inconsistency in application interface. That is, the processing unit 13 determines that the expected data items indicated in the request message 14 may be inconsistent with the data items defined in the database. Then, the processing unit 13 performs an exception process 15 to check for consistency between the request message 14 and the data items of the database.

The exception process 15 includes outputting error information that indicates that the request message 14 is inconsistent with the data items defined in the database, for example. Before outputting the error information, the exception process 15 carries out a detailed analysis of analyzing a query or write data included in the request message and making a comparison with the definitions of data items indicated in the data structure information, for example.

If it is confirmed from the detailed analysis that the request message 14 is consistent with the data items defined in the database, the requested read or write operation on the database may be permitted. The request message 14 generated expecting old data items may be consistent with the current data items defined in the database, depending on the type of change made to the data items of the database. If it is confirmed from the detailed analysis that the request message 14 is inconsistent with the data items defined in the database, on the other hand, the requested read or write operation may be rejected and error information may be output.

As described above, in the first embodiment, the information processing apparatus 10 receives the request message 14 including the code 14a from the information processing apparatus 20 and compares the code 11a held in the information processing apparatus 10 with the code 14a included in the request message 14. If the codes lie and 14a are the same, the information processing apparatus 10 permits the requested read or write operation on the database. If the codes 11a and 14a are different, the information processing apparatus performs the exception process 15 to check for consistency of data items.

With the above approach, it is determined readily whether the current data structure of the database matches an expected data structure indicated in the request message 14. For example, in a situation where the current data structure of the database and the expected data structure indicated in the request message 14 match, it is possible to detect the match without carrying out a detailed analysis of comparing these data structures with each other. This streamlines the check for consistency in application interface. Thus, for example, after the definitions of data items of the database are updated, it is possible to efficiently check whether the update is reflected on the client correctly.

Second Embodiment

A second embodiment will now be described.

Figure 2:
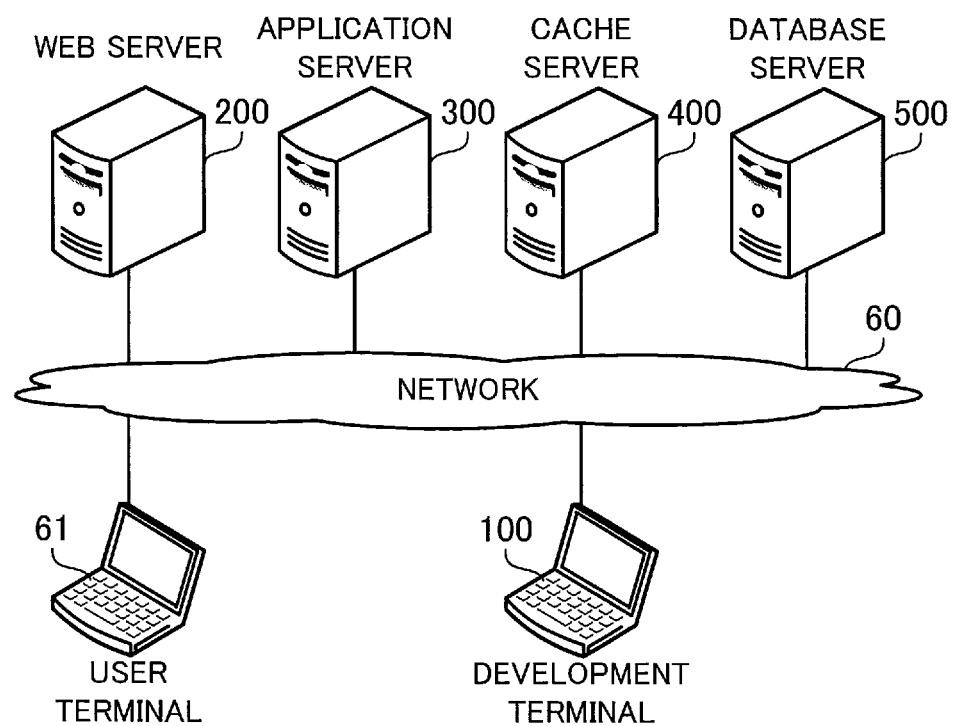
FIG. 2 is a view for explaining an information processing system according to a second embodiment.

FIG. 2 illustrates an example of an information processing system according to the second embodiment.

The information processing system of the second embodiment includes a user terminal 61, a development terminal 100, a web server 200, an application server 300, a cache server 400, and a database server 500. The user terminal 61, development terminal 100, web server 200, application server 300, cache server 400, and database server 500 are connected to a network 60. The network 60 may include a wide-area network, such as the Internet, or a local area network (LAN).

The user terminal 61 is a computer that is operated by a user, and executes a web client application, such as a web browser. The user terminal 61 accesses the web server 200 using a hypertext transfer protocol (HTTP) and receives web content from the web server 200.

The development terminal 100 is a computer that is operated by a developer of a server application. The development terminal 100 sends various kinds of created programs and setting information to the web server 200, application server 300, cache server 400, and database server 500.

The web server 200 is a server computer that performs HTTP communication with the user terminal 61. The web server 200 receives an HTTP request from the user terminal 61 and requests the application server 300 to perform data processing in accordance with the HTTP request. The web server 200 receives the result of the data processing from the application server 300, generates an HTTP response based on the received result of the data processing, and sends the HTTP response to the user terminal 61.

The application server 300 is a server computer that executes a server application implementing business logic. The application server 300 performs data processing in accordance with a request from the web server 200 and returns the result of the data processing to the web server 200. The application server 300 may access the cache server 400 to obtain data used for the data processing from the cache server 400. In addition, the application server 300 may access the database server 500 to obtain data used for the data processing from the database server 500. Furthermore, the application server 300 may send data to the cache server 400 and also may send data to the database server 500.

The cache server 400 is a server computer that caches data to be used by the application server 300. For the data caching, a key-value store (KVS), which is a database, is used for holding data in a key-value form. The cache server 400 may search the KVS to retrieve target data in response to an access from the application server 300 and return the retrieved data to the application server 300. In addition, the cache server 400 may access the database server 500 to obtain data that does not exist in the KVS from the database server 500 and store the data in the KVS. Also, the cache server 400 may store data in the KVS in response to an access from the application server 300. In addition, the cache server 400 may transfer data stored in the KVS to the database server 500.

The database server 500 is a server computer that holds a database and executes a database management system (DBMS) for controlling access to the database. As the database, a relational database (RDB) that contains data in tabular form is used. The database server 500 may search the RDB in response to an access from the application server 300 to retrieve target data and return the retrieved data to the application server 300. In addition, the database server 500 may store data in the RDB in response to an access from the application server 300. The database server 500 may search the RDB in response to an access from the cache server 400 to retrieve target data and return the retrieved data to the cache server 400. In addition, the database server 500 may store data in the RDB in response to an access from the cache server 400.

Figure 3:
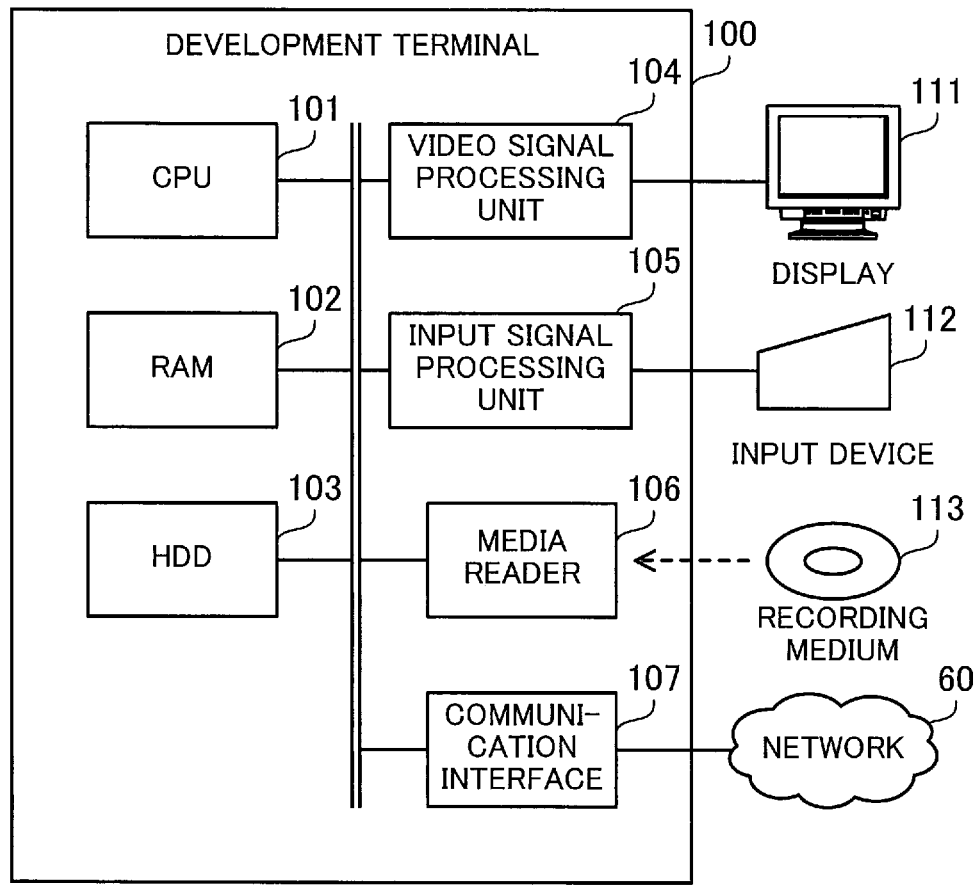
FIG. 3 is a block diagram illustrating an example of a hardware configuration of a development terminal.

FIG. 3 is a block diagram illustrating an example of a hardware configuration of the development terminal.

The development terminal 100 includes a CPU 101, RAM 102, an HDD 103, a video signal processing unit 104, an input signal processing unit 105, a media reader 106, and a communication interface 107. The user terminal 61, web server 200, application server 300, cache server 400, and database server 500 may be implemented with the same hardware configuration as the development terminal 100. The RAM 102 and HDD 103 correspond to the storage unit 11 of the first embodiment. The communication interface 107 corresponds to the communication unit 12 of the first embodiment. The CPU 101 corresponds to the processing unit 13 of the first embodiment.

The CPU 101 is a processor that executes instructions of a program. The CPU 101 loads at least part of a program and data from the HDD 103 to the RAM 102 and runs the program. In this connection, the CPU 101 may include a plurality of processor cores, and the development terminal 100 may include a plurality of processors. Processes to be described later may be performed in parallel using a plurality of processors or processor cores. In addition, a set of multiple processors may be called a "multiprocessor" or simply a "processor".

The RAM 102 is volatile semiconductor memory that temporarily stores a program to be executed by the CPU 101 and data to be used by the CPU 101 in processing. In this connection, the development terminal 100 may include another kind of memory other than RAM or a plurality of memory devices.

The HDD 103 is a non-volatile storage device that stores therein software programs including operating system (OS) and middleware programs, and data. In this connection, the development terminal 100 may be provided with another kind of storage device, such as a flash memory or solid state drive (SSD), or a plurality of non-volatile storage devices.

The video signal processing unit 104 outputs images to a display 111 connected to the development terminal 100, in accordance with instructions from the CPU 101. As the display 111, a cathode ray tube (CRT) display, liquid crystal display (LCD) display, a plasma display, an organic electroluminescence (OEL) display, or any kind of display may be used.

The input signal processing unit 105 obtains an input signal from an input device 112 connected to the development terminal 100 and outputs the input signal to the CPU 101. As the input device 112, a mouse, a touch panel, a touchpad, a trackball, a keyboard, a remote controller, a button switch, or any kind of input device may be used. In addition, plural kinds of input devices may be connected to the development terminal 100.

The media reader 106 reads programs and data from a recording medium 113. As the recording medium 113, a magnetic disk, an optical disc, a magneto-optical disk (MO), a semiconductor memory device, or another may be used, for example. Magnetic disks include flexible disks (FDs) and HDDs. Optical discs include compact discs (CDs) and digital versatile discs (DVDs).

The media reader 106 copies programs and data read from the recording medium 113 to another recording medium, such as the RAM 102 or HDD 103, for example. The read program is executed by the CPU 101, for example. In this connection, the recording medium 113 may be a portable recording medium, and may be used for distributing programs and data. In addition, the recording medium 113 and HDD 103 may be called computer-readable recording media.

The communication interface 107 is for communication with the web server 200, application server 300, cache server 400, and database server 500 over the network 60. The communication interface 107 may be a wired communication interface that is connected to a wired communication device, such as a switch or a router, or a wireless communication interface that is connected to a wireless communication device, such as a base station or an access point.

Figure 4:
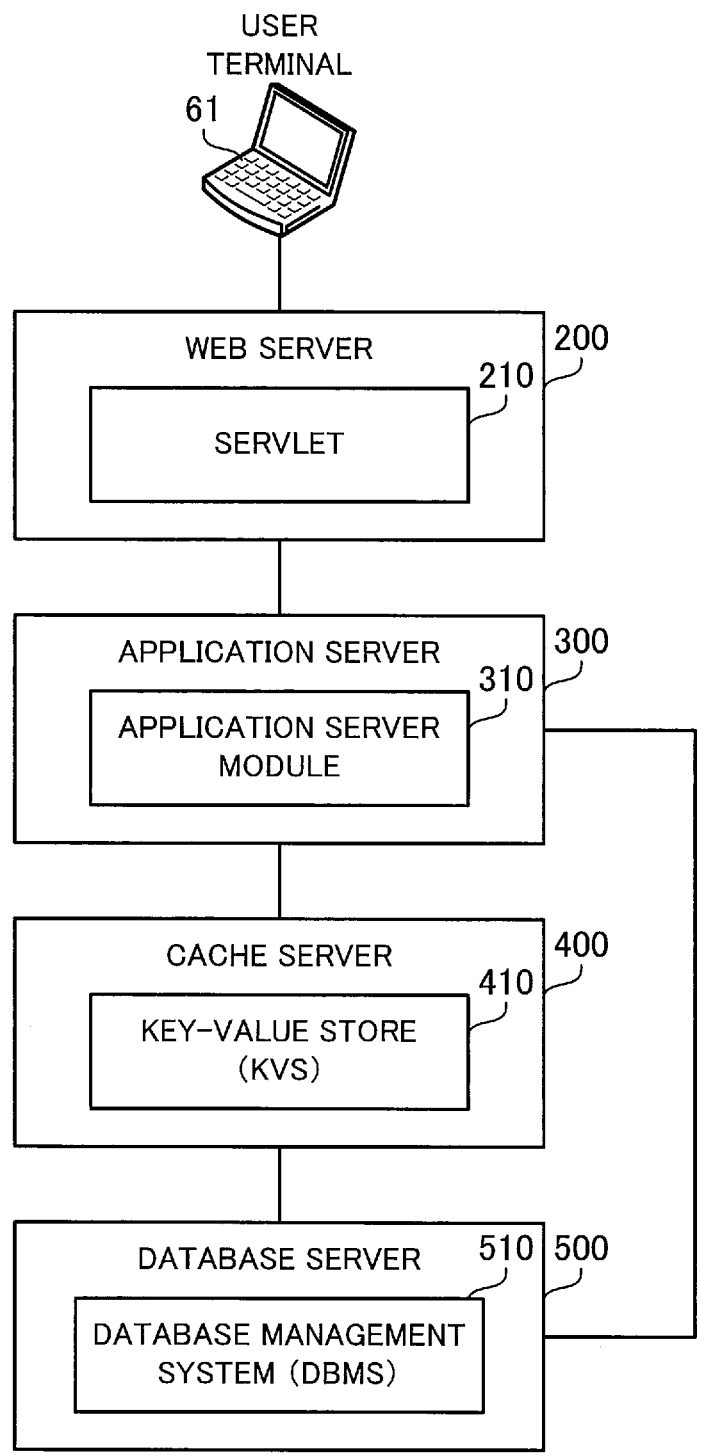
FIG. 4 illustrates an example of deployment of software applications.

FIG. 4 illustrates an example of deployment of software applications.

As described earlier, the web server 200, application server 300, cache server 400, and database server 500 communicate with each other to provide services for the user terminal 61. The web server 200 functions as a point of contact for the user terminal 61.

A servlet 210 is deployed in the web server 200. The servlet 210 is an application for performing data processing in accordance with HTTP requests received from the user terminal 61. The web server 200 may execute middleware that serves as an application platform for controlling the launch and communication of the servlet 210, and the servlet 210 may be a segmented program that runs on the application platform. The servlet 210 may send request messages to the application server 300.

An application server module 310 is deployed in the application server 300. The application server module 310 is an application for performing data processing in accordance with request messages received from the web server 200. The application server 300 may execute middleware that serves as an application platform for controlling the launch and communication of the application server module 310, and the application server module 310 may be a segmented program that runs on the application platform. The application server module 310 may send request messages to the cache server 400 or database server 500.

A KVS 410 is deployed in the cache server 400. The KVS 410 is middleware for managing a database in key-value format. The database in key-value format is stored in a non-volatile storage device, such as an HDD, or volatile memory, such as RAM. The KVS 410 manipulates the database for retrieval and updates in accordance with request messages received from the application server 300. The KVS 410 may send request messages to the database server 500.

A DBMS 510 is deployed in the database server 500. The DBMS 510 is middleware for managing a relational database in tabular form. The relational database is stored in a non-volatile storage device, such as an HDD, or volatile memory, such as RAM, in the database server 500. The DBMS 510 manipulates the database for retrieval and updates in accordance with request messages received from the application server 300 and cache server 400.

In view of communication between two computers, one computer functions as a "client," which sends request messages, and the other functions as a "server," which receives the request messages. A single computer may function as both "client" and "server".

With regard to the web server 200 and the application server 300, the web server 200 corresponds to a client and the application server 300 corresponds to a server. With regard to the application server 300 and the cache server 400, the application server 300 corresponds to a client and the cache server 400 corresponds to a server. With regard to the application server 300 and database server 500, the application server 300 corresponds to a client and the database server 500 corresponds to a server. With regard to the cache server 400 and database server 500, the cache server 400 corresponds to a client and the database server 500 corresponds to a server.

For example, the servlet 210 functions as a server for the user terminal 61 and as a client for the application server 300. In this connection, in the web server 200, a server module and a client module may be configured separately and the former may be configured to call the latter. Similarly, the application server module 310 functions as a server for the web server 200 and as a client for the cache server 400 and database server 500. In this connection, in the application server 300, a server module and a client module may be configured separately and the former may be configured to call the latter. The KVS 410 functions as a server for the application server 300 and as a client for the database server 500. In this connection, in the cache server 400, a server module and a client module may be configured separately and the former may be configured to call the latter.

After the information processing system of the second embodiment starts to operate, the data structure of a database may be changed. For example, the information processing system is expanded by adding a new column to the relational database or setting a longer data length for an existing column. Such a change in the data structure of the database influences a protocol for request messages that are communicated between different applications and also influences the sender of the request messages.

For example, a change in the data structure of the database in the database server 500 influences request messages that are sent from the cache server 400 to the database server 500, and also influences the KVS 410. In addition, the change in the data structure of the database in the database server 500 influences request messages that are sent from the application server 300 to the database server 500, and also influences the application server module 310. A change in the data structure of the database in the cache server 400 influences request messages that are sent from the application server 300 to the cache server 400, and also influences the application server module 310.

Therefore, to change the data structure of a database may lead to an interface inconsistency between applications. The interface inconsistency may cause an unexpected error in data processing of a server because the data structure expected by the requested server and the data structure expected by the requesting client (that is, an expected data structure indicated in a request message) are different. The interface inconsistency may occur if a client application is not modified correctly according to the change in the data structure of the database or if the client application is not distributed correctly.

To deal with this, the information processing system of the second embodiment supports efficient execution of a check for interface consistency. The check for interface consistency, which will be described later, is carried out each time when the data structure of a database is changed and the information processing system is resumed, for example. Alternatively, the check for interface consistency may be carried out in a test period from change in the data structure of the database to resume of the information processing system. In this case, the check function may be removed from the information processing system after the test period has ended.

Hereinafter, as an example, the check process will be described, focusing on interface consistency between the application server 300 and the database server 500. As will be described later, this check process is applicable for interface consistency between the application server 300 and the cache server 400 and for interface consistency between the cache server 400 and the database server 500.

Figure 5:
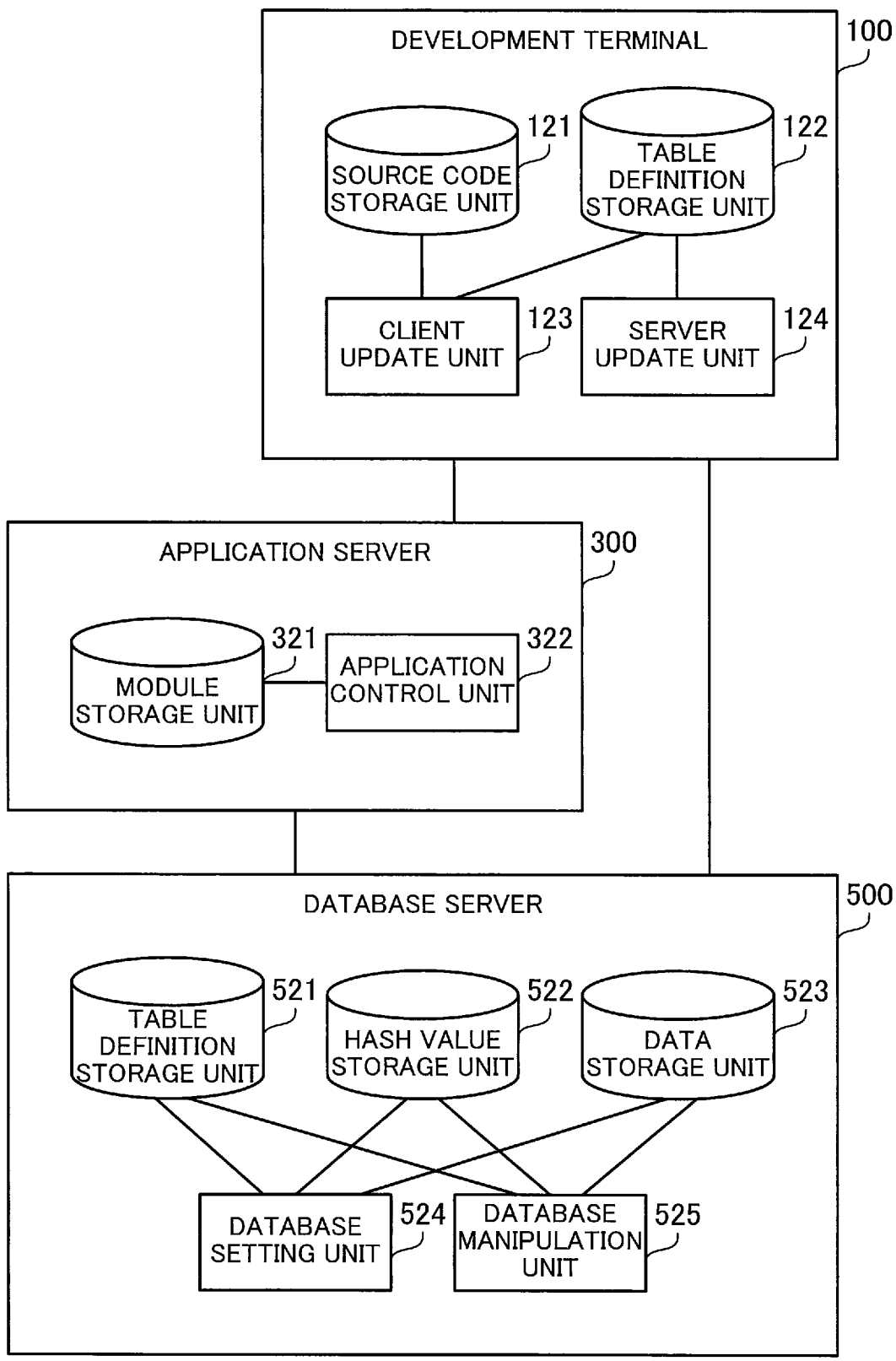
FIG. 5 is a block diagram illustrating an example of functions of the development terminal and servers.

FIG. 5 is a block diagram illustrating an example of functions of the development terminal and servers.

The development terminal 100 includes a source code storage unit 121, a table definition storage unit 122, a client update unit 123, and a server update unit 124. The source code storage unit 121 and table definition storage unit 122 are implemented by using a storage space of the RAM 102 or HDD 103, for example. The client update unit 123 and server update unit 124 are implemented by the CPU 101 running a program, for example.

The source code storage unit 121 stores therein the source code (user source code) of a client program created by the developer. The source code storage unit 121 also stores therein the source code (application programming interface (API) source code) of an API program created by the client update unit 123. The API program includes a function (may be called a method or a procedure) describing a specific method of sending request messages to the database server 500, and corresponds to a library from a perspective of the user source code. In the case where the user source code is generated to call the API program, the user source code does not need to describe the specific method of sending request messages.

The table definition storage unit 122 stores therein a table definition file describing the data structure of a database stored in the database server 500. The table definition file defines the data structure in a prescribed data definition language based on SQL grammar, for example. To change the data structure of the database, the table definition file stored in the table definition storage unit 122 is updated by the developer.

When the table definition file stored in the table definition storage unit 122 is updated, the client update unit 123 generates an API source code from the updated table definition file and stores it in the source code storage unit 121. The generated API source code describes a method of sending request messages conforming to the changed data structure. For example, a function that includes arguments for columns having the changed data structure and is to generate a request message in a format conforming to the columns having the changed data structure is generated. The request message is described in a prescribed data manipulation language based on SQL grammar, for example.

At this time, the client update unit 123 generates a code from the updated table definition file and embeds the generated code in the API source code. The API source code is generated such that the code is appended to each request message at the time of sending the request message.

In the second embodiment, a hash value of the table definition file is used as the code. The hash value is calculated using a hash function, such as a message digest algorithm 5 (MD5) or secure hash algorithm-1 (SHA-1). The hash value has a fixed length of 16 or 20 bytes, for example, and has irreversibility in which an original table definition file is not reproducible. Different hash values are expected to be calculated from different table definition files. In this connection, these codes may be used for determining identity between table definition files. Instead of hash values, bit strings, like ciphertext, may be used as the codes. The codes may have a variable length and may have reversibility in which original table definition files are reproducible.

In this connection, a single table definition file defines a data structure for one table in a relational database, and a hash value is calculated for each table.

When the API source code is generated, the client update unit 123 compiles the user source code and API source code and links these codes and other libraries to thereby generate a client module. The client update unit 123 includes software programs that function as a compiler and linker. After the API source code is generated, the user source code may be modified by the developer so as to match the API source code. The generated client module corresponds to the application server module 310. The client update unit 123 distributes the generated client module to the application server 300.

In the case where a plurality of computers corresponding to the application server 300 are provided, the client update unit 123 distributes the generated client module to these computers. However, if the developer fails to modify the user source code correctly, an interface inconsistency may occur between the application server 300 and the database server 500. In addition, if the client module is not distributed to the application server 300 correctly, an interface inconsistency may occur between the application server 300 and the database server 500.

When a table definition file stored in the table definition storage unit 122 is updated, the server update unit 124 sends the updated table definition file to the database server 500. Then, the server update unit 124 instructs the database server 500 to reflect the sent table definition file on the database. For example, the server update unit 124 sends a command for updating the table definitions to the database server 500. The updated table definition file may be sent together with the command to the database server 500.

The application server 300 includes a module storage unit 321 and an application control unit 322. The module storage unit 321 is implemented by using a storage space of RAM or an HDD provided in the application server 300, for example. The application control unit 322 is implemented by a CPU of the application server 300 running a program.

The module storage unit 321 stores therein a compiled client module distributed from the development terminal 100. The client module is a segmented program corresponding to the application server module 310, for example. The application control unit 322 is an application platform that starts the client module stored in the module storage unit 321 and controls the execution of the client module. The application control unit 322 sends request messages to the database server 500 as instructed by the client module.

The database server 500 includes a table definition storage unit 521, a hash value storage unit 522, a data storage unit 523, a database setting unit 524, and a database manipulation unit 525. The table definition storage unit 521, hash value storage unit 522, and data storage unit 523 are implemented by using a storage space of RAM or an HDD provided in the database server 500, for example. The database setting unit 524 and database manipulation unit 525 are implemented by a CPU of the database server 500 running a program, for example. The database setting unit 524 and database manipulation unit 525 are included in the DBMS 510, for example.

The table definition storage unit 521 stores therein a table definition file distributed by the development terminal 100. The table definition storage unit 521 may store therein a previous table definition file in addition to the latest table definition file.

The hash value storage unit 522 stores therein a hash values calculated by the database setting unit 524. The development terminal 100 and the database server 500 calculate the same hash value from the same table definition file. As described earlier, another kind of code may be generated from a table definition file, instead of a hash value, and in this case, the generated code is stored in the hash value storage unit 522. The hash value storage unit 522 is able to store therein hash values corresponding to old table definition files, in addition to the latest hash value.

The data storage unit 523 holds a relational database. The data storage unit 523 stores therein tables each with one or more columns and one or more records (rows). A new table is added or an existing table is deleted in response to a command from the development terminal 100. In addition, a column is added to or deleted from an existing table, or the attributes of a column in the existing table are changed in accordance with a command received from the development terminal 100.

The database setting unit 524 sets the data structure of the database in accordance with an instruction from the development terminal 100. The database setting unit 524 receives a table definition file from the development terminal 100 and stores it in the table definition storage unit 521. When receiving a command from the development terminal 100, the database setting unit 524 executes the table definition file on the database. At this time, the database setting unit 524 calculates a hash value from the table definition file and stores the calculated hash value in the hash value storage unit 522.

The database manipulation unit 525 receives a request message from the application server 300. After that, the database manipulation unit 525 checks for interface consistency between the received request message and the latest database. If a column specified in the request message does not exist in the database or if data included in the request message has a data type that does not conform to the definitions of a corresponding column of the database, the database manipulation unit 525 takes it as an interface inconsistency.

If no interface inconsistency is detected, the database manipulation unit 525 manipulates the database in accordance with the request message. For example, the database manipulation unit 525 retrieves data from the database, inserts data in the database, updates data in the database, or deletes data from the database. The database manipulation unit 525 sends a response message indicating the result of the database manipulation to the application server 300. If an interface inconsistency is detected, on the other hand, the database manipulation unit 525 rejects the requested database manipulation and sends an error message to the application server 300. In addition, the database manipulation unit 525 records error information in a system log of the database server 500.

To streamline the check for interface consistency, the database manipulation unit 525 carries out a simple check using hash values first. The database manipulation unit 525 compares the hash value included in the received request message with the hash value stored in the hash value storage unit 522. If these hash values are the same, the database manipulation unit 525 skips a detailed check, which will be described below, and determines that there is no interface inconsistency.

If the hash values are different, on the other hand, the database manipulation unit 525 carries out the detailed check for interface consistency. In the detailed check, the database manipulation unit 525 analyzes the received request message and makes a comparison with a table definition file stored in the table definition storage unit 521. For example, the database manipulation unit 525 determines whether a column specified in the request message is defined in the table definition file. For example, the database manipulation unit 525 confirms the data type (for example, character data type, integer data type, or others) and data length of data included in the request message and determines whether these are consistent with the definitions described in the table definition file. Even if the request message is generated on the basis of an old table definition file, no interface inconsistency may occur, depending on changes made to the data structure.

Figure 6:
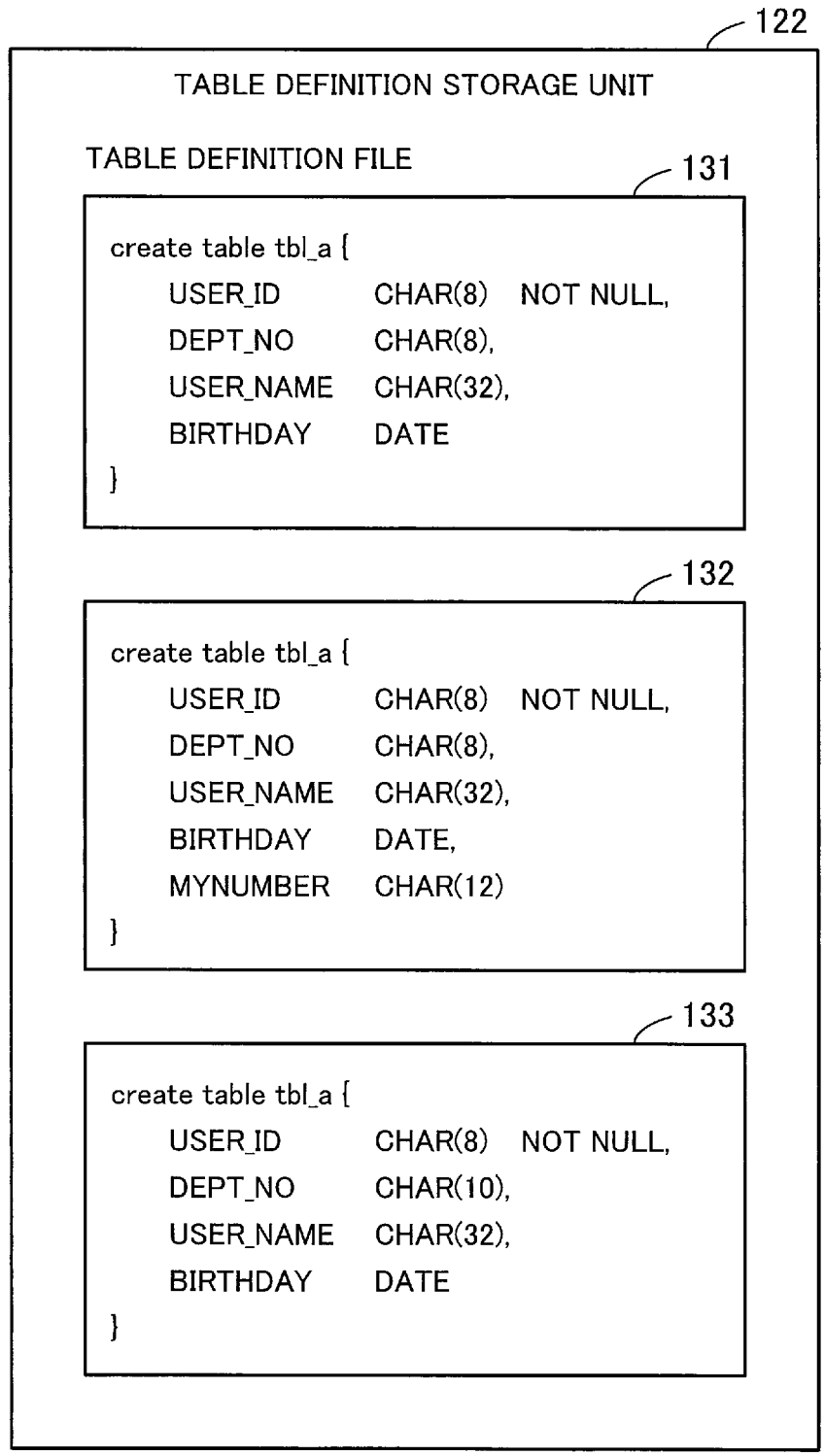
FIG. 6 illustrates a first example of table definition files.

FIG. 6 illustrates a first example of table definition files.

A table definition file 131 is an example of an old table definition file before an update. A table definition file 132 is an example of a new table definition file after an update. A table definition file 133 is another example of a new table definition file after an update, which is different from the table definition file 132. The table definition files 131, 132, and 133 may be stored in the table definition storage unit 122. In addition, the table definition files 131, 132, and 133 may be copied to the table definition storage unit 521.

The table definition file 131 defines the data structure of one table in a relational database. The tale definition file 131 defines the column name, data type, data length and other attributes with respect to each column of the table. The table definition file 131 defines four columns: USER_ID, DEPT_NO, USER_NAME, and BIRTHDAY. The USER_ID column has a character data type and a data length of eight bytes, and does not permit Null value. The DEPT_NO column has a character data type and a data length of eight bytes. The USER_NAME column has a character data type and a data length of 32 bytes. The BIRTHDAY column has a date data type.

The table definition file 132 is an update of the table definition file 131. The table definition file 132 additionally defines a MYNUMBER column at the end. The MYNUMBER column has a character data type and a data length of 12 bytes. The table definition file 133 is an update of the table definition file 131. In the table definition file 133, the data length of the DEPT_NO column has been updated to 10 bytes.

FIG. 7 illustrates a first example of a hash value table.

A hash value table 531 is stored in the hash value storage unit 522. The hash value table 531 includes the following items: database name, schema name, table name, and hash value. A plurality of databases may be created in the database server 500. These databases are identified by database names. A plurality of schemas may be defined for one database, and these schemas are identified by schema names. A plurality of tables may be defined for one schema, and these tables are identified by table names.

In the second embodiment, one hash value is registered for each table. A hash value registered in the hash value table 531 is calculated from the latest table definition file of a table. When the table definition file of a table is updated, the hash value corresponding to the table is updated in the hash value table 531 accordingly. A request message includes a hash value corresponding to a target table to be manipulated.

A hash value is calculated based on substantial information relating to a data structure, such as table name, column name, data type, data length and other attributes, but not based on non-substantial information that does not relate to the data structure, such as blanks or comments. Such non-substantial information is deleted from a table definition file to thereby extract only substantial information, and a character string indicating the substantial information is entered to a hash function. For example, in the case of the table definition file 131 of FIG. 6, a portion from "table tbl_a" to "BIRTHDAY DATE" is extracted, blanks are removed from this portion, and the remaining character string is entered to the hash function.

FIG. 8 illustrates a first example of a request message.

A request message 331 is sent from the application server 300 to the database server 500. The request message 331 includes the following items: server internet protocol (IP) address, server port number, client ID, request number, client IP address, client port number, client process ID, and client thread ID. The request message 331 also includes the following items: session ID, transmission time, operation type, target resource, hash value, input information, output information, and data storage length.

The server IP address is the IP address of the database server 500. The server port number is the number of a port that the database server 500 uses to receive the request message. The client ID is an identifier assigned to an application platform of the application server 300. The request number is an identification number assigned to the request message by the application platform of the application server 300. The client IP address is the IP address of the application server 300. The client port number is the number of a port that the application server 300 uses to send the request message. The client process ID is the identification number of a process that is started by the client module. The client thread ID is the identification number of a thread that is started by the client module.

The session ID is the identification number of a connection established between the application server 300 and the database server 500. The transmission time indicates when the application server 300 sent the request message. The operation type is the type of database manipulation, and the database manipulation includes retrieval (SELECT), insertion (INSERT), update (UPDATE), and deletion (DELETE). The target resource indicates the table name of a target table to be manipulated. The hash value is a hash value corresponding to the target table to be manipulated. The input information includes retrieval conditions for specifying a target record to be manipulated or data to be written. The output information is the column name of a column to be included in a retrieval result.

The data storage length indicates the number of bytes per record in a storage region of RAM, which are used by the client module to store a retrieval result. If a record with a length exceeding the data storage length is sent from the database server 500 to the application server 300, the application server 300 may cut off data at the last column. Alternatively, the database server 500 may cut off the data at the last column so that the length of the record to be sent to the application server 300 does not exceed the data storage length.

The following describes how the development terminal 100 and database server 500 operate.

Figure 9:
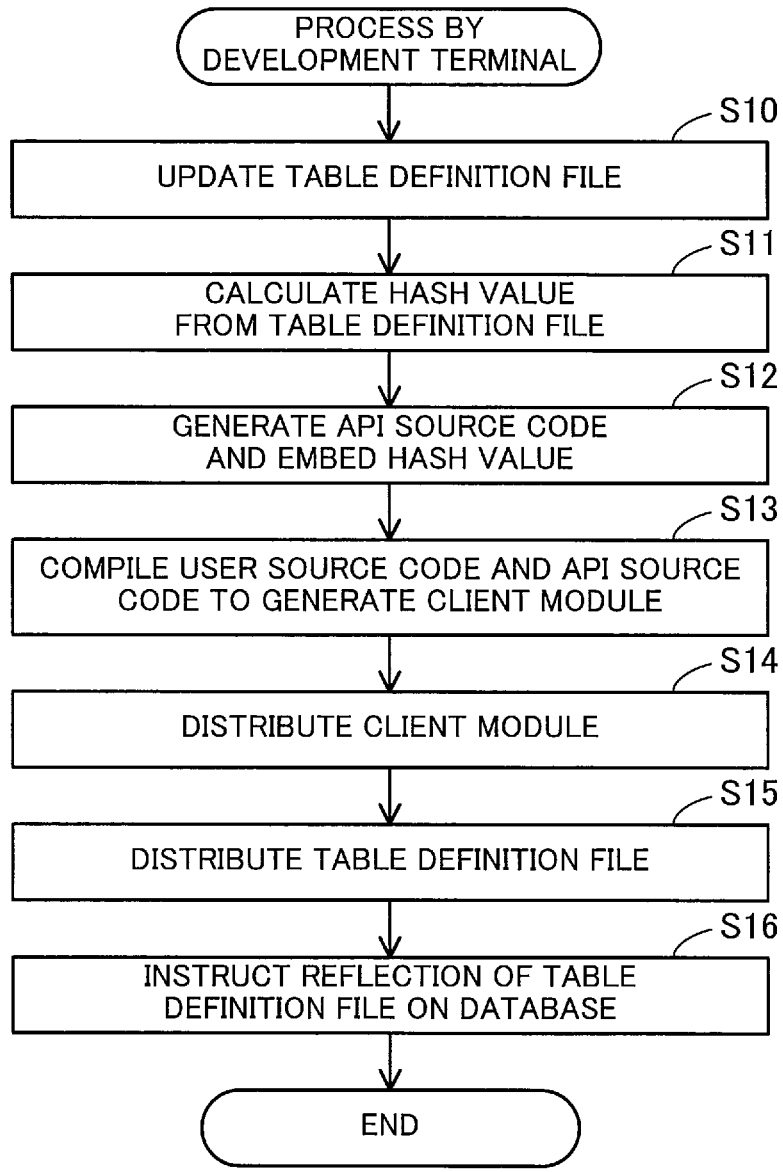
FIG. 9 is a flowchart illustrating an example of a process performed by the development terminal.

FIG. 9 is a flowchart illustrating an example of a process performed by the development terminal.

(S10) The development terminal 100 updates a table definition file stored in the table definition storage unit 122 in accordance with inputs from the developer using the development terminal 100.

(S11) The client update unit 123 calculates a hash value from the updated table definition file using a hash function, such as MD5 or SHA-1.

(S12) The client update unit 123 generates an API source code from the updated table definition file. The API source code is the source code of an API program for sending request messages requesting database manipulation on a database with a data structure specified by the table definition file. For request messages to be sent, a user source code is generated such as to call the API program. By doing so, the developer's load of generating the user source code is reduced. The client update unit 123 embeds the hash value in the generated API source code, such as to append the hash value of step S11 to a request message at the time of sending the request message.

(S13) The client update unit 123 obtains the user source code describing the processes of the client module. The user source code may be modified on the basis of the API source code by the developer after step S12. The client update unit 123 compiles the user source code and API source code and links these and other libraries to thereby generate a client module.

(S14) The client update unit 123 distributes the client module generated at step S13 to specified computers including the application server 300. The recipient computers may be specified by the developer using the development terminal 100.

(S15) The server update unit 124 distributes the updated table definition file to specified computers including the database server 500. The recipient computers may be specified by the developer using the development terminal 100.

(S16) The server update unit 124 instructs the recipient computers specified at step S15 to reflect the table definition file on the database. A command for instructing this reflection may be sent together with the table definition file. In this connection, in the second embodiment, the database server 500 calculates a hash value from the distributed table definition file. Alternatively, the development terminal 100 may be configured to calculate the hash value and notify the database server 500 of the calculated hash value.

Figure 10:
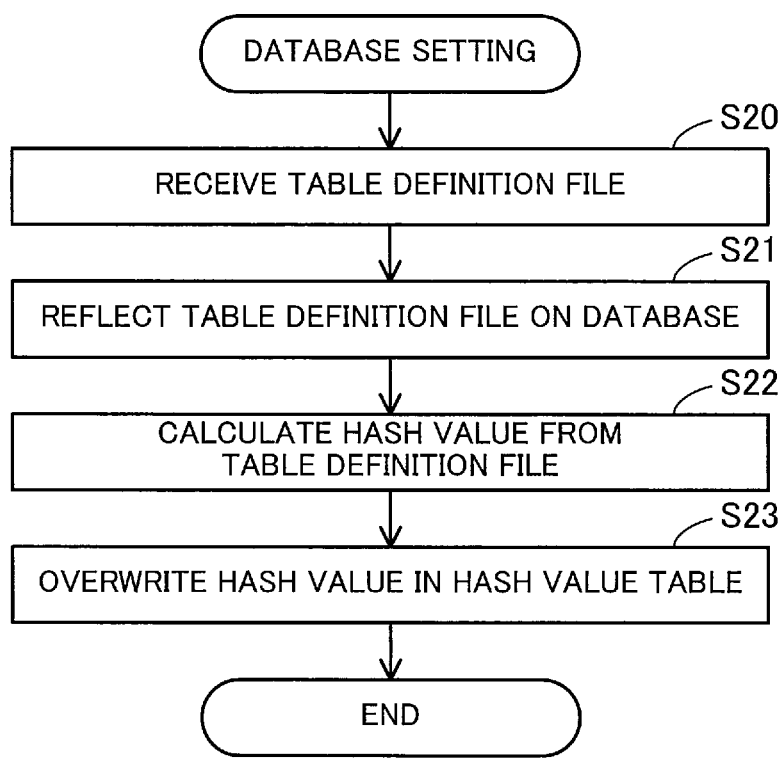
FIG. 10 is a flowchart illustrating a first example of database setting.

FIG. 10 is a flowchart illustrating a first example of database setting.

(S20) The database setting unit 524 receives a table definition file from the development terminal 100 and stores the received table definition file in the table definition storage unit 521.

(S21) The database setting unit 524 reflects the table definition file of step S20 on a database in accordance with an instruction from the development terminal 100. If the database has no table with a table name specified in the table definition file, the database setting unit 524 generates a new table according to the table definition file. If the database has a table with the table name specified in the table definition file, the database setting unit 524 modifies the existing table according to the table definition file. The modification of the existing table may include an addition of a new column and a modification of an existing column. The modification of an existing column may include conversion of data in the column.

(S22) The database setting unit 524 calculates a hash value from the table definition file of step S20 using a hash function, such as MD5 or SHA-1.

(S23) The database setting unit 524 registers the hash value calculated at step S22 in association with the table name indicated in the table definition file in the hash value table 531. If the hash value table 531 has an old hash value corresponding to the table name, the database setting unit 524 overwrites it with the new hash value. That is to say, only the latest hash value is registered for one table.

Figure 11:
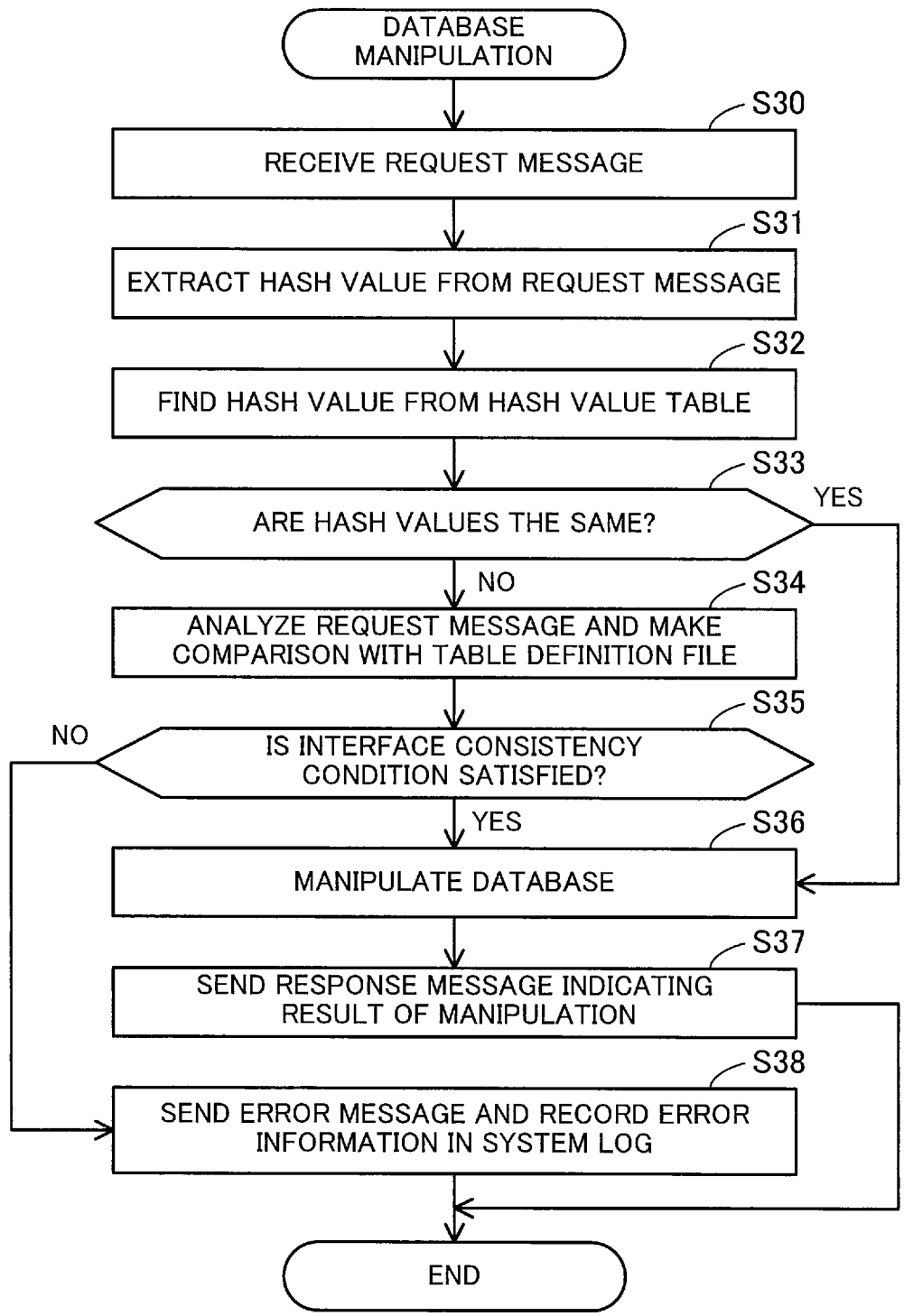
FIG. 11 is a flowchart illustrating a first example of database manipulation.

FIG. 11 is a flowchart illustrating a first example of database manipulation.

(S30) The database manipulation unit 525 receives a request message requesting database manipulation from the client module. The request message includes a hash value embedded in the client module.

(S31) The database manipulation unit 525 extracts a hash value from the request message.

(S32) The database manipulation unit 525 searches the hash value table 531 to find a hash value associated with a target table specified in the request message.

(S33) The database manipulation unit 525 compares the hash value of step S31 with the hash value of step S32 to determine whether these hash values are the same. If the hash values are the same, the database manipulation unit 525 determines that there is no interface inconsistency with respect to the received request message, and then the process proceeds to step S36. If the hash values are different, the process proceeds to step S34.

(S34) The database manipulation unit 525 carries out a detailed check for interface consistency. In the detailed check, the database manipulation unit 525 analyzes the received request message and makes a comparison with the definitions of columns described in the table definition file. For example, the database manipulation unit 525 confirms consistency in terms of column name, data type, data length, and others.

(S35) The database manipulation unit 525 determines from the result of the detailed analysis of step S34 whether an interface consistency condition is satisfied. If the interface consistency condition is satisfied, that is, if there is no interface inconsistency, the process proceeds to step S36. If the interface consistency condition is not satisfied, that is, if an interface inconsistency exists, the process proceeds to step S38.

(S36) The database manipulation unit 525 manipulates the database, such as performing retrieval, insertion, update, deletion or others on the database, in accordance with the request message.

(S37) The database manipulation unit 525 generates a response message indicating the result of the database manipulation and sends the response message to the requesting client module. The response message may include retrieved data or control information indicating a write success or failure.

(S38) The database manipulation unit 525 generates an error message indicating the detection of interface inconsistency and sends the error message to the requesting client module. In addition, the database manipulation unit 525 records error information indicating the detection of interface inconsistency in a system log stored in the database server 500. The system log may be sent to the development terminal 100 or to a staff member who analyzes failure causes.

Figure 12:
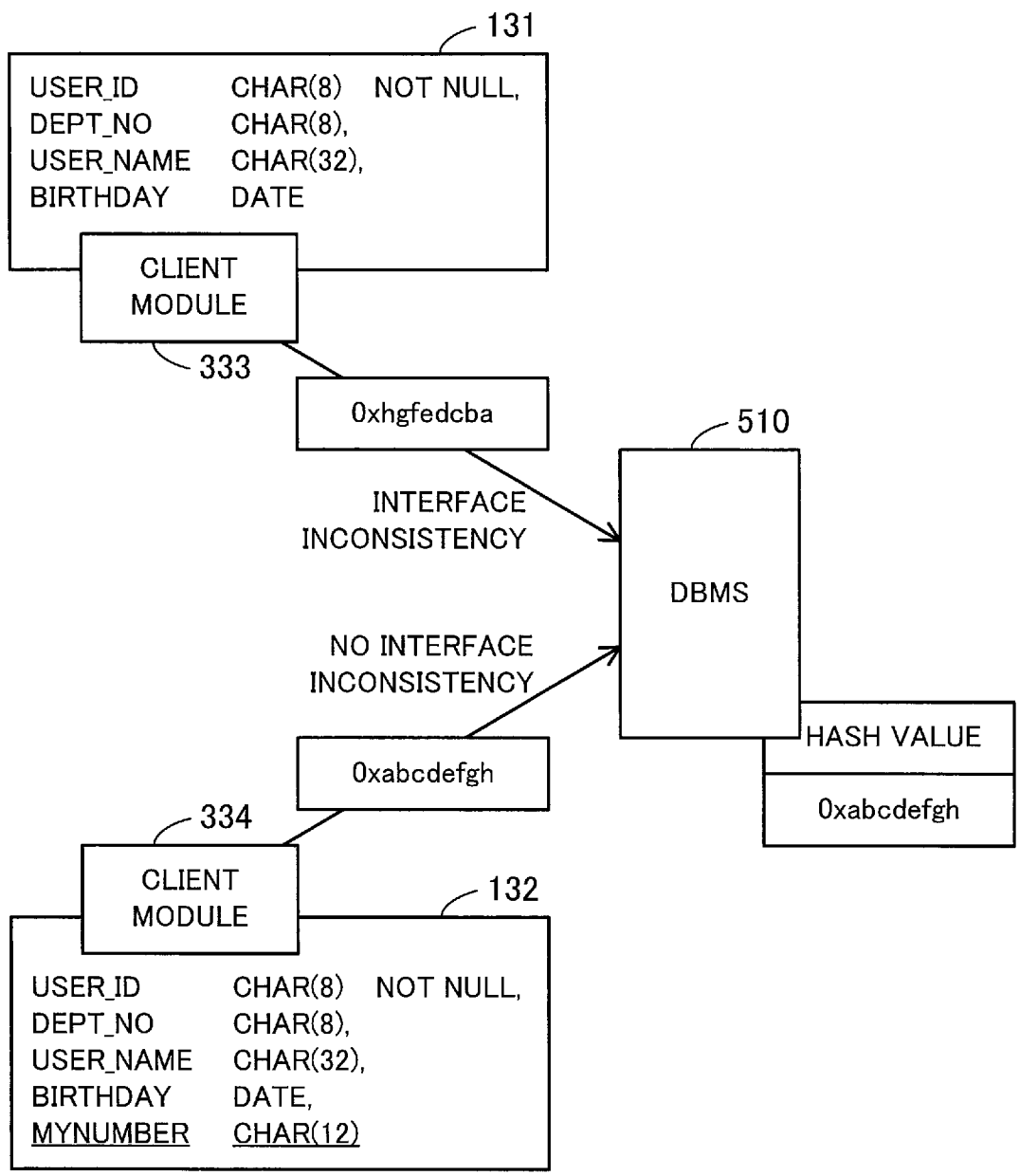
FIG. 12 illustrates a first example of checking for interface consistency.

FIG. 12 illustrates a first example of checking for interface consistency.

In this example, assume that the table definition file 131 is updated to the table definition file 132. That is to say, a new column is added to the end of an existing table.

A client module 333 is an old client module generated from the table definition file 131. A hash value "0xhgfedcba" calculated from the table definition file 131 is appended to a request message that is sent from the client module 333. A client module 334 is a new client module generated from the table definition file 132. A hash value "0xabcdefgh" calculated from the table definition file 132 is appended to a request message that is sent from the client module 334. The DBMS 510 holds the latest hash value "0xabcdefgh". It is also assumed that there is a computer that executes the client module 333 due to an error in distribution of the client module 334.

With respect to a request message received from the client module 334, the DBMS 510 determines that there is no interface inconsistency because the hash value included in the request message is the same as the hash value held in the DBMS 510. With respect to a request message received from the client module 333, however, the DBMS 510 determines that there may be an interface inconsistency because the hash value included in the request message is different from the hash value held in the DBMS 510. In this case, the DBMS 510 carries out the detailed check for interface inconsistency.

As described above, in the case where the data structure is changed so as to add a column to the end, the hash value of the table definition file is changed accordingly. In the simple check of the second embodiment, only request messages that conform to the new data structure after the addition of the column are determined not to cause interface inconsistency. Request messages that conform to an old data structure before the addition of the column is determined to possibly cause interface inconsistency, and then the detailed check is carried out.

Figure 13:
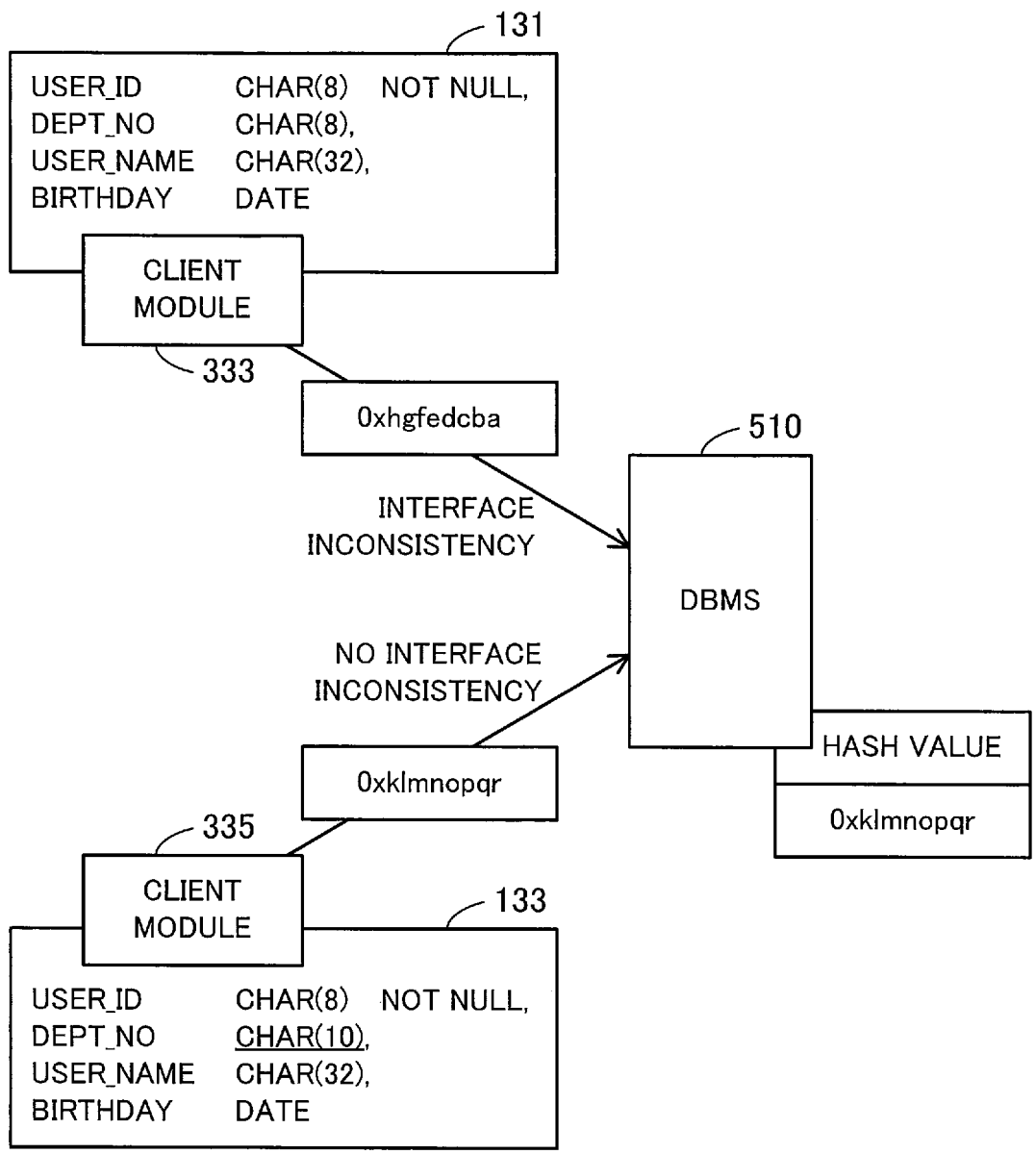
FIG. 13 illustrates a second example of checking for interface consistency.

FIG. 13 illustrates a second example of checking for interface consistency.

In this example, it is assumed that the table definition file 131 is updated to the table definition file 133. That is, the data length of a column of an existing table is changed.

A client module 335 is a new client module generated from the table definition file 133. A hash value "0xklmnopqr" calculated from the table definition file 133 is appended to a request message that is sent from the client module 335. The DBMS 510 holds the latest hash value "0xklmnopqr". It is also assumed that there is still a computer that executes the client module 333 due to an error of distribution of the client module 335.

With respect to a request message received from the client module 335, the DBMS 510 determines that there is no interface inconsistency because the hash value included in the request message is the same as the hash value held in the DBMS 510. With respect to a request message received from the client module 333, however, the DBMS 510 determines that there may be an interface inconsistency because the hash value included in the request message is different from the hash value held in the DBMS 510. In this case, the DBMS 510 carries out the detailed check for interface consistency.

As described above, in the case where the data structure is changed so as to change the data length of a column, the hash value of the table definition file is changed accordingly. In the simple check of the second embodiment, only request messages that conform to the new data structure after the change of the data length are determined not to cause interface inconsistency. Request messages that conform to an old data structure before the change of the data length are determined to possibly cause interface inconsistency and therefore the detailed check is carried out.

Heretofore, it has been described how to check request messages that are sent from the application server 300 to the database server 500. Request messages that are sent from the cache server 400 to the database server 500 may be checked in the same way. In this case, a client module for the cache server 400 is generated from a user source code and an API source code. Alternatively, the user source code for the cache server 400 may be generated by pre-compiling an SQL-embedded program created by the developer.

In addition, request messages that are sent from the application server 300 to the cache server 400 may be checked in the same way. In this case, a table definition file for the KVS 410 is generated by the developer, and a hash value is calculated from the table definition file and an API source code is generated. Now, an example of the table definition file for the KVS 410 and an example of a request message that is sent from the application server 300 to the cache server 400 will be described.

FIG. 14 illustrates a second example of a table definition file.

A table definition file 134 defines the data structure of a database in key-value format. The database in key-value format stores one value in association with one key. The value may include two or more value items.

The table definition file 134 defines the name, data type, and data length for each of a key and one or more value items. The table definition file 134 has the following definitions: USERID, COMPANY, LNAME, FNAME, EMAIL, and PASSWD. The USERID is a key and has a character data type and a data length of four bytes. The COMPANY is a first value item and has an integer data type. The LNAME is a second value item and has a character data type and a data length of 255 bytes. The FNAME is a third value item and has a character data type and a data length of 255 bytes. The EMAIL is a fourth value item and has a character data type and a data length of 255 bytes. The PASSWD is a fifth value item and has a character data type and a data length of 255 bytes.

The development terminal 100 calculates a hash value from the table definition file 134, generates a client module having the hash value embedded therein, from the table definition file 134, and sends the client module to the application server 300. In addition, the development terminal 100 distributes the table definition file 134 to the cache server 400. The cache server 400 reflects the table definition file 134 on a database. In addition, the cache server 400 calculates a hash value from the table definition file 134 and holds the calculated hash value therein.

FIG. 15 illustrates a second example of a request message.

A request message 332 is sent from the application server 300 to the cache server 400. The request message 332 includes the following items: server IP address, server port number, client ID, request number, client IP address, client port number, client process ID, and client thread ID. In addition, the request message 332 includes the following items: session ID, transmission time, operation type, target resource, hash value, input information, and data storage length. The client ID, request number, client IP address, client port number, client process ID, client thread ID, and transmission time have the same definitions as those in the above-described request message 331.

The server IP address is the IP address of the cache server 400. The server port number is the number of a port that the cache server 400 uses to receive the request message. The session ID is an identification number of a connection established between the application server 300 and the cache server 400. The operation type indicates a type of database manipulation, and the database manipulation includes retrieval (GET), storage (PUT), and deletion (DELETE).

The target resource is the name of a target data store to be manipulated. The hash value is a hash value corresponding to the target data store to be manipulated. The cache server 400 compares the hash value included in the request message 332 with the hash value held therein, and determines that there is no interface inconsistency if these hash values are the same. The input information includes the key of a record to be obtained, a value to be stored, or the key of a record to be deleted.

The data storage length indicates the number of bytes per record in a storage region of RAM, which are used by the client module to store an obtained record. If a record with a length exceeding the data storage length is sent from the cache server 400 to the application server 300, the application server 300 may cut off data of the last value item. Alternatively, the cache server 400 may cut off the data of the last value item so that the length of the record to be sent to the application server 300 does not exceed the data storage length.

In the information processing system of the second embodiment, a hash value of an updated table definition file is calculated, a client module having the hash value embedded therein is generated and is then distributed to a client computer. The client computer executes the client module, so as to send a request message including the hash value. In addition, the data structure of the database is changed based on the updated table definition file and a new hash value is registered in the server computer. After that, the hash value included in the request message is compared with the latest hash value held in the server computer. If these hash values are the same, it is determined that there is no interface inconsistency, without carrying out the detailed check.

As described above, even if there may be an interface inconsistency due to an error of modification or distribution of a client module, it is possible to efficiently check for interface consistency. This approach eliminates the need of carrying out a long-time regression test using a variety of request messages after the data structure of a database is changed, thereby reducing the time to resume operation. In addition, the approach reduces the load of checking imposed on the server computer, so that the server computer is able to check for interface consistency occasionally during operation. Furthermore, an API source code compatible with the data structure of a database is automatically generated, thereby reducing the developer's load of generating a user source code.

Third Embodiment

A third embodiment will now be described. In this embodiment, differences from the second embodiment will be mainly described, and overlapping descriptions will be omitted.

In the second embodiment, even an addition of a new column to the end may lead to an interface inconsistency between a request message conforming to a data structure before the update and a database having the updated data structure. However, normally, only an addition of a new column to the end does not cause an error due to the interface inconsistency.

With respect to a request message requesting retrieval or update with respect to a specified column, the column is not influenced by the addition of a new column. Therefore, the request message may be processed correctly on the updated database. With respect to a request message requesting retrieval over all columns, on the other hand, each record extracted from a database becomes long due to an influence of the addition of a new column. However, because of a lack of storage space prepared by the client module, the data of the new column at the end is deleted by the client computer. Otherwise, the data of the new column at the end is deleted by the server computer to meet a data storage length specified by the request message. As a result, the length of a record recognized by the client module is not influenced by the addition of a new column.

Considering this, the third embodiment is configured such that, in the case of changing a data structure by adding a new column to the end, a simple check results in determining that a request message conforming to a data structure before the change does not cause an interface inconsistency. The information processing system of the third embodiment is implemented with the same configuration as the second embodiment illustrated in FIGS. 2 to 6. In this connection, the reference numerals used in FIGS. 2 to 6 are used in the third embodiment.

FIG. 16 illustrates a second example of a hash value table.

A hash value table 532 is stored in a hash value storage unit 522 of a database server 500, in place of the hash value table 531 of the second embodiment. The hash value table 532 has the following items: database name, schema name, table name, hash value count, timestamp, and hash value. In this third embodiment, one or more hash values are registered for one table. The hash value count indicates the number of hash values registered for a table. The timestamp indicates when a hash value was registered in the hash value table 532. One hash value is calculated from one table definition file.

When the table definition file of a table is updated, existing hash values associated with the table are deleted and only a new hash value is registered, or alternatively the new hash value is added with the existing hash values kept undeleted, depending on the update made to the table definition file. In the case where a change in data structure is an addition of a new table or an addition of a new column to the end of an existing table, existing hash values are not deleted. In the other cases, the existing hash values are deleted. If the hash value included in a request message is the same as any of one or more hash values registered in the hash value table 532, it is determined that there is no interface inconsistency.

Figure 17:
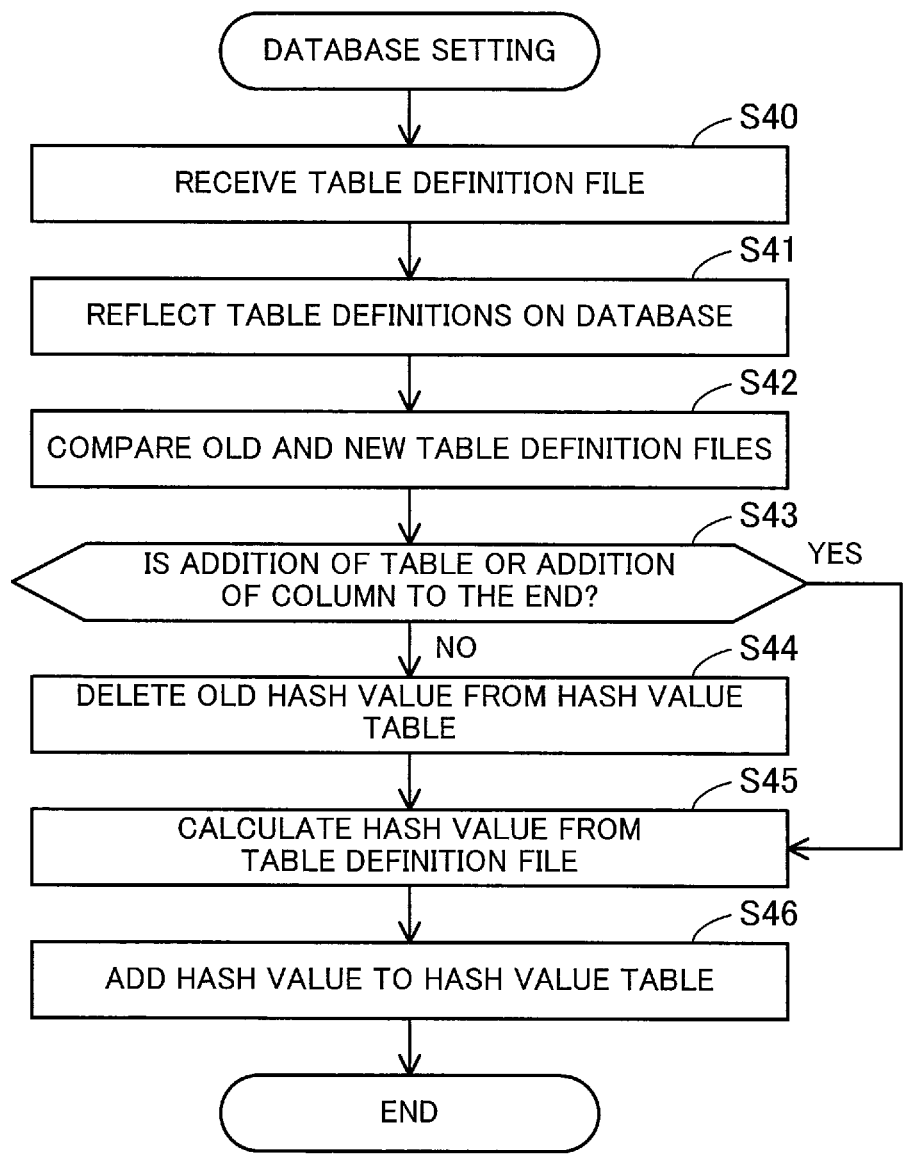
FIG. 17 is a flowchart illustrating a second example of database setting.

FIG. 17 is a flowchart illustrating a second example of database setting.

(S40) A database setting unit 524 receives a table definition file from a development terminal 100 and stores the received table definition file in a table definition storage unit 521.

(S41) The database setting unit 524 reflects the table definition file of step S40 on a database in accordance with an instruction from the development terminal 100.

(S42) The database setting unit 524 compares one or more old table definition files stored in the table definition storage unit 521 with the new table definition file of step S40 to determine the type of change made to the data structure. If a table name indicated in the new table definition file does not appear in any of the old table definition files, the type is determined as an addition of a table. If there is an old table definition file that has the same table name as the new table definition file, all columns of the old table definition file are described in the new table definition file, and the new table definition file has a new column at the end, the type is determined as an addition of a new column to the end. If there is an old table definition file that has the same table name as the new table definition file and at least one column of the new definition file has a different column name, data type, or data length from that of the old table definition file, the type is determined as a modification of a column.

(S43) The database setting unit 524 determines whether the type of change in the data structure, determined at step S42, is one of addition of a table and addition of a column to the end. If the type of change in the data structure is an addition of a table or an addition of a column to the end, the process proceeds to step S45. Otherwise, the process proceeds to step S44.

(S44) The database setting unit 524 deletes all hash values corresponding to the table name indicated in the new table definition file from the hash value table 532.

(S45) The database setting unit 524 calculates a hash value from the new table definition file using a hash function, such as MD5 or SHA-1.

(S46) The database setting unit 524 adds the hash value calculated at step S45 to the hash value table 532 in association with the table name indicated in the new table definition file. At this time, the database setting unit 524 adds a timestamp indicating the present time to the hash value.

As described above, in the case where the type of change made to the data structure is an addition of a table, a hash value corresponding to the table is newly registered. In the case where the type of change made to the data structure is an addition of a column to the end, a new hash value is added with all existing hash values corresponding to the table kept as a log. The number of hash values to be kept as a log is not limited. The number of hash values registered as a log increases each time a column is added to the end successively. In the case where the type of change made to the data structure is not an addition of a table or an addition of a column to the end, all existing hash values corresponding to the table are deleted and only a new hash value is registered.

Figure 18:
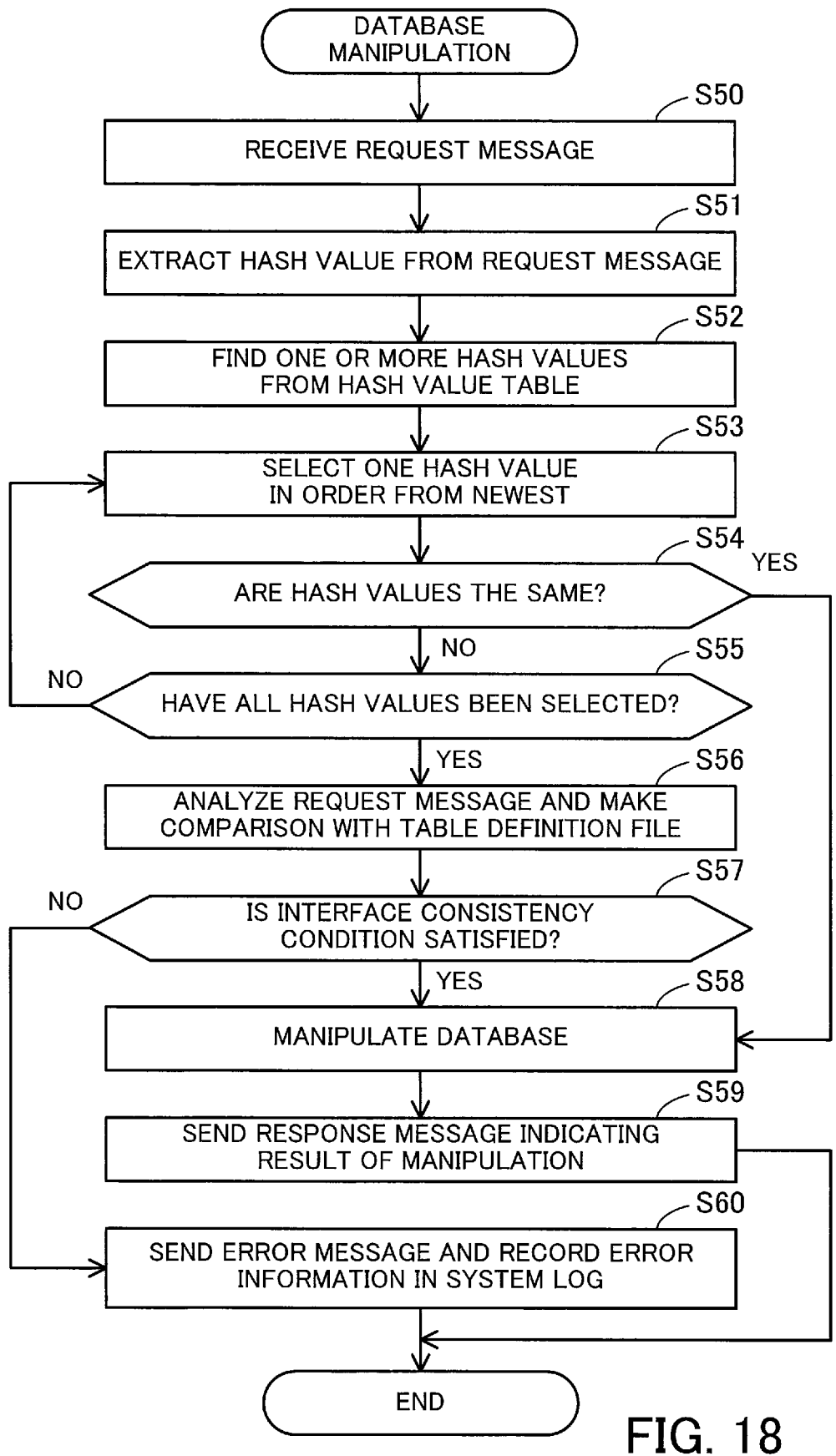
FIG. 18 is a flowchart illustrating a second example of database manipulation.

FIG. 18 is a flowchart illustrating a second example of database manipulation.

(S50) A database manipulation unit 525 receives a request message requesting database manipulation from the client module. The request message includes a hash value embedded in the client module.

(S51) The database manipulation unit 525 extracts the hash value from the request message.

(S52) The database manipulation unit 525 searches a hash value table 532 to find one or more hash values corresponding to a target table specified in the request message.

(S53) The database manipulation unit 525 selects one of the hash values found at step S52, in reverse order of their timestamps.

(S54) The database manipulation unit 525 compares the hash value of step S51 with the hash value of step S53 to determine whether these hash values are the same. If the hash values are the same, the database manipulation unit 525 determines that the received request message does not cause an interface inconsistency, and then the process proceeds to step S58. Otherwise, the process proceeds to step S55.

(S55) The database manipulation unit 525 determines whether all hash values found at step S52 have been selected. If all the hash values have been selected, the process proceeds to step S56. If one or more of the hash values have not been selected, the process proceeds to step S53. Therefore, in the case where two or more hash values, including logged hash values, correspond to the target table, it is determined that there is no interface inconsistency if any of these hash values is the same as the hash value included in the request message. There may be a possibility that hash values of three or more generations are registered, and the hash value of the oldest generation is the same as the hash value included in the request message.

(S56) The database manipulation unit 525 carries out a detailed check for the interface consistency. In the detailed check, the database manipulation unit 525 analyzes the received request message and makes a comparison with the definitions of columns described in the table definition file.

(S57) The database manipulation unit 525 determines from the result of the detailed analysis of step S56 whether the interface consistency condition is satisfied. If the interface consistency condition is satisfied, that is, if there is no interface inconsistency, the process proceeds to step S58. If the interface consistency condition is not satisfied, that is, if an interface inconsistency exists, the process proceeds to step S60.

(S58) The database manipulation unit 525 manipulates the database, such as performing retrieval, insertion, update or deletion on the database, in accordance with the request message.

(S59) The database manipulation unit 525 generates a response message indicating a result of the database manipulation and sends the response message to the requesting client module.

(S60) The database manipulation unit 525 generates an error message indicating the detection of interface inconsistency and sends the error message to the requesting client module. The database manipulation unit 525 also records error information indicating the detection of interface inconsistency in a system log stored in the database server 500.

Figure 19:
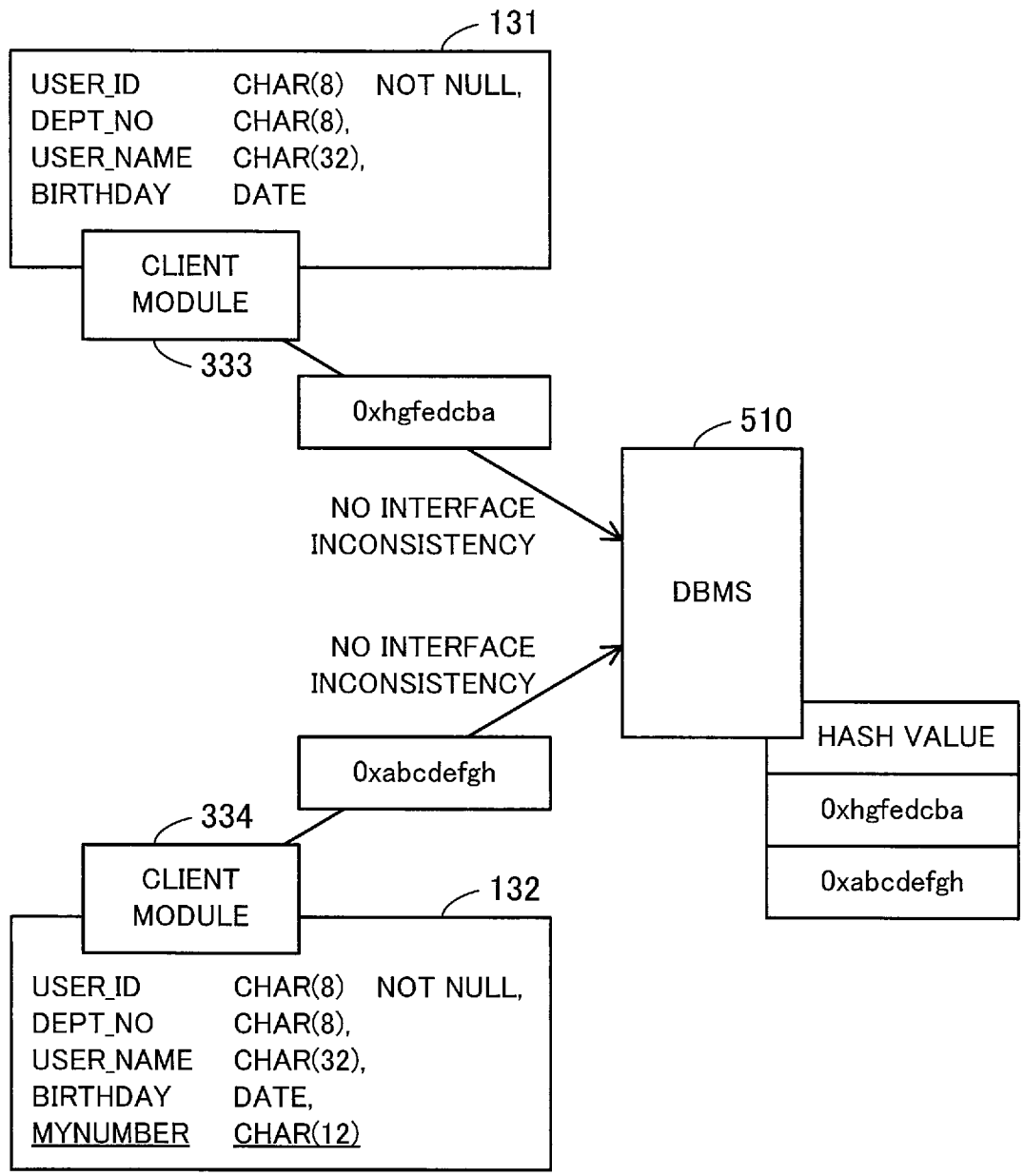
FIG. 19 illustrates a third example of checking for interface consistency.

FIG. 19 illustrates a third example of checking for interface consistency.

Consider now the case where the table definition file 131 of FIG. 6 is updated to the table definition file 132 of FIG. 6. That is, a new column is added to the end of an existing table.

A client module 333 is an old client module generated from the table definition file 131 and is to send request messages having a hash value "0xhgfedcba" appended thereto. A client module 334 is a new client module generated from the table definition file 132 and is to send request messages having a hash value "0xabcdefgh" appended thereto. Since the change to the data structure is an addition of a column to the end, the DBMS 510 has at least previous hash value "0xhgfedcba" as a log, in addition to the latest hash value "0xabcdefgh". In addition, the DBMS 510 may hold more hash values including the second to the latest hash value, as a log. The DBMS 510 is able to hold old hash values for an unlimited number of generations as long as only an addition of a table and an addition of a column to the end are done as the types of changes made to the data structure.

With respect to a request message received from the client module 334, the DBMS 510 determines that there is no interface inconsistency, because the hash value included in the received request message is the same as the latest hash value held in the DBMS 510. In addition, with respect to a request message received from the client module 333, the DBMS 510 determines that there is no interface inconsistency, because the hash value included in the received request message is the same as a hash value kept as a log in the DBMS 510.

In this connection, in the case where the table definition file 131 is updated to the table definition file 133, the change made to the data structure is a modification of a column. Therefore, the DBMS 510 deletes the previous hash value "0xhgfedcba" and holds the latest hash value "0xklmnopqr" only. By doing so, a simple check provides the same result as illustrated in FIG. 13.

The information processing system of the third embodiment produces the same effects as that of the second embodiment. In addition, in the third embodiment, in the case where a change in data structure is an addition of a column to the end only, a simple check results in determining that a request message conforming to the data structure before the change does not cause an interface inconsistency. In this case, a detailed check is skipped, thereby streamlining the check for interface consistency.

According to one aspect, it is possible to efficiently check for consistency in application interface.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. An information processing apparatus comprising:
a memory configured to store therein a first code generated from first data structure information, the first data structure information indicating columns of a table stored in a relational database; and a processor configured to add into the memory a second code generated from second data structure information indicating the columns after update without deleting the first code when the update satisfies a prescribed condition, to obtain a request message including information on at least one target column of the table and a third code and requesting a data read or write operation on the table, to compare first second code with the third code, to permit the requested data read or write operation by skipping an exception process upon determining that the second code and the third code are identical, to compare the first code with the third code upon determining that the second code and the third code are different, to permit the requested data read or write operation by skipping the exception process upon determining that the first code and the third code are identical, and to perform the exception process upon determining that the first code and the third code are different, the exception process including checking for consistency between the second data structure information and the information on the at least one target column.

2. The information processing apparatus according to claim 1, wherein, when the update does not satisfy the prescribed condition, the first code is deleted from the memory.

3. The information processing apparatus according to claim 1, wherein the prescribed condition is that the update is an addition of a new column to a prescribed location of the table.

4. The information processing apparatus according to claim 1, wherein:
when the update that satisfies the prescribed condition is made a plurality of times, the memory keeps a plurality of codes corresponding to the plurality of times as a log; and
when another update that does not satisfy the prescribed condition is made, the log is deleted from the memory.

5. The information processing apparatus according to claim 1, wherein the first code is a hash value calculated from the first data structure information.

6. The information processing apparatus according to claim 5, wherein the hash value is generated using at least one of column names, data types and data lengths of the columns, and a prescribed hash function.

7. The information processing apparatus according to claim 1, wherein the exception process includes outputting error information upon detecting an inconsistency between the columns and the at least one target column.

8. An information processing system comprising:
a first computer that includes a first processor, the first computer being configured to send a request message including information on at least one target column among columns of a table stored in a relational database and a third code, the request message requesting a data read or write operation on the table; and
a second computer that includes a second processor, the second computer being configured to hold a first code generated from first data structure information and to receive the request message, the first data structure information indicating the columns,
wherein the second computer adds a second code generated from second data structure information indicating the columns after update without deleting the first code when the update satisfies a prescribed condition, compares the first second code with the third code, permits the requested data read or write operation by skipping an exception process upon determining that the second code and the third code are identical, compares the first code with the third code upon determining that the second code and the third code are different, permits the requested data read or write operation by skipping the exception process upon determining that the first code and the third code are identical, and performs the exception process upon determining that the first code and the third code are different, the exception process including checking for consistency between the second data structure information and the information on the at least one target column.

9. The information processing system according to claim 8, further comprising a third computer that includes a third processor, the third computer being configured to generate a client program having the third code embedded therein, based on the columns before or after the update, and to distribute the client program to the first computer, the client program being a program for sending the request message.

10. A non-transitory computer-readable recording medium storing a computer program causing a computer to perform a process comprising:
adding a second code generated from second data structure information without deleting a first code generated from first data structure information, the first data structure information indicating columns of a table stored in a relational database, the second data structure information indicating the columns after update, the adding being performed when the update satisfies a prescribed condition;
obtaining a request message including information on at least one target column of the table and a third code, the request message requesting a data read or write operation on the table;
comparing the second code with the third code; and
permitting the requested data read or write operation bar skipping an exception process upon determining that the second code and the third code are identical;
comparing the first code with the third code upon determining that the second code and the third code are different;
permitting the requested data read or write operation by skipping the exception process upon determining that the first code and the third code are identical; and
performing the exception process upon determining that the first code and the third code are different, the exception process including checking for consistency between the second data structure information and the information on the at least one target column.

* * * * *